(12) United States Patent
Morris

(10) Patent No.: US 7,452,427 B2
(45) Date of Patent: Nov. 18, 2008

(54) CORROSION RESISTANT CONVERSION COATINGS

(75) Inventor: Eric L. Morris, Irvine, CA (US)

(73) Assignee: Deft, Inc., Irvine, CA (US)

(*) Notice: Subject to any disclaimer, the term of this patent is extended or adjusted under 35 U.S.C. 154(b) by 512 days.

(21) Appl. No.: 11/002,741

(22) Filed: Dec. 1, 2004

(65) Prior Publication Data

US 2006/0113007 A1 Jun. 1, 2006

(51) Int. Cl.
C23C 22/00 (2006.01)

(52) U.S. Cl. ............... 148/243; 148/272; 148/273; 148/275; 106/14.05; 106/14.11; 106/14.21

(58) Field of Classification Search ............ 148/243; 428/471; 106/14.44
See application file for complete search history.

(56) References Cited

U.S. PATENT DOCUMENTS

| | | | |
|---|---|---|---|
| 3,969,152 A | 7/1976 | Melotik | 148/6.15 Z |
| 4,359,347 A | 11/1982 | Da Fonte, Jr. | |
| 5,194,130 A | 3/1993 | Byszewski et al. | 204/182.4 |
| 5,221,371 A | 6/1993 | Miller | 148/273 |
| 5,346,722 A | 9/1994 | Beauseigneur et al. | 427/300 |
| 5,356,492 A | 10/1994 | Miller | 148/273 |
| 5,362,335 A | 11/1994 | Rungta | 148/272 |
| 5,372,638 A | 12/1994 | DePue et al. | 106/404 |
| 5,582,654 A | 12/1996 | Mansfeld et al. | 148/273 |
| 5,668,072 A | 9/1997 | Holcombe, Jr. et al. | 501/152 |
| 5,932,083 A | 8/1999 | Stoffer et al. | 205/261 |
| 6,022,425 A | 2/2000 | Nelson | 148/272 |
| 6,068,711 A | 5/2000 | Lu et al. | 148/273 |
| 6,190,780 B1 | 2/2001 | Shoji et al. | 428/472 |
| 6,200,672 B1 | 3/2001 | Tadokoro et al. | 428/328 |
| 6,206,982 B1 | 3/2001 | Hughes et al. | 148/273 |
| 6,375,726 B1 * | 4/2002 | Matzdorf et al. | 106/14.44 |
| 6,406,562 B1 * | 6/2002 | Lu et al. | 148/272 |
| 6,503,565 B1 | 1/2003 | Hughes et al. | 427/299 |
| 6,537,618 B2 | 3/2003 | Lovelace et al. | 427/444 |
| 6,544,659 B2 * | 4/2003 | Yamashita | 428/471 |
| 6,669,786 B2 | 12/2003 | Sampath | 148/273 |
| 2002/0043649 A1 | 4/2002 | Mansfeld et al. | 252/387 |
| 2002/0084002 A1 | 7/2002 | Hardin et al. | 148/243 |
| 2002/0096230 A1 | 7/2002 | Hardin et al. | 148/243 |
| 2003/0207132 A1 | 11/2003 | Sambasivan et al. | 428/469 |
| 2004/0016910 A1 | 1/2004 | Phelps et al. | 252/387 |
| 2004/0020567 A1 | 2/2004 | Baldwin | 148/273 |
| 2004/0020568 A1 | 2/2004 | Phelps et al. | 148/273 |
| 2004/0028820 A1 | 2/2004 | Stoffer et al. | 427/376.1 |
| 2004/0062873 A1 | 4/2004 | Jung et al. | 427/407.1 |
| 2004/0096587 A1 | 5/2004 | Sambasivan et al. | 427/378 |
| 2004/0096707 A1 | 5/2004 | Sambasivan et al. | 428/698 |
| 2004/0104377 A1 | 6/2004 | Phelps et al. | |

FOREIGN PATENT DOCUMENTS

WO  WO 88/06639  9/1988

OTHER PUBLICATIONS

Johnson, B.Y. et al., "Effect of coating parameters on the microstructure of cerium oxide conversion coatings," Materials Science and Engineering, (2003), pp. 225-231, vol. A361, No. 1-2.
Rivera, B.F. et al., "Deposition and characterization of cerium oxide conversion coatings on aluminum alloy 7075-T6," Surface and Coatings Technology, (2004), pp. 349-356, vol. 176, No. 3.
Hinton, B.R.W. et al., *ATB Metallurgie*, vol. XXXVII, No. 2 (1997).
Hinton, B.R.W. et al., *Materials Forum*, 9(3):162-173 (1986).

* cited by examiner

*Primary Examiner*—Roy King
*Assistant Examiner*—Weiping Zhu
(74) *Attorney, Agent, or Firm*—Kristin C. Hiibner; Sheldon Mak Rose & Anderson

(57) ABSTRACT

A conversion coating composition for coating a metal substrate is provided which imparts corrosion resistance to the underlying metal substrate. The conversion coating composition comprises an aqueous carrier and first and second rare earth element salts. A complete coating system employing the conversion coating composition is also provided as well as methods for conversion coating a metal substrate with the rare earth element conversion coating compositions of the present invention.

19 Claims, No Drawings

CORROSION RESISTANT CONVERSION COATINGS

BACKGROUND

The oxidation and degradation of metals used in aerospace, commercial, and private industries are a serious and costly problem. To prevent the oxidation and degradation of the metals used in these applications, an inorganic protective coating can be applied to the metal surface. This inorganic protective coating, also referred to as a conversion coating, may be the only coating applied to the metal, or the coating can be an intermediate coating to which subsequent coatings are applied.

Chromate based coatings are currently used as inorganic conversion coatings because they provide corrosion resistant properties and adhesion for application of subsequent coatings. However, due to environmental concerns over chromium based compounds in the environment, there is a need for an environmentally safer replacement for chromate based conversion coatings. There is also a need for environmentally safer conversion coatings that can provide corrosion resistance to an underlying metal surface and adhesion to subsequently applied coatings.

Cerium and other rare earth element containing coatings have been identified as potential replacements for chromate based coatings in metal finishing. These coatings include cerium and other rare earth element containing coatings that are formed by various processes such as immersion, electroplating from a cerium nitrate solution, plating from an acidic cerium chloride containing solution and an oxidant (at elevated temperatures), as well as multi-step processes, and electrolytic and non-electrolytic processes having a sealing step. Further information on such coatings can be found in: Hinton, B. R. W., et al., *Materials Forum*, Vol. 9, No. 3, pp. 162-173, 1986; Hinton, B. R. W., et al., *ATB Metallurgie*, Vol XXXVII, No. 2, 1997; U.S. Pat. Nos. 5,582,654; 5,932,083; 6,022,425; 6,206,982; 6,068,711; 6,406,562; and 6,503,565; U.S. Patent Application Publication No. US 2004/0028820 A1; and PCT Application Publication No. WO 88/06639.

However, at least some of the coatings prepared using these compositions and methods do not perform as well as those formed using chromate treatments and/or can develop blisters on the surface and exhibit poor adhesion. Further, at least some of the prior art cerium and other rare earth element containing coatings can also suffer from one or more of the following disadvantages: (1) a tendency of the rare earth element to precipitate in solution away from the metal surface in the form of a sludge-like material; (2) difficulty in obtaining a uniform coating which does not tend to over-coat and exhibit poor adhesion to the substrate; (3) the necessity to use multiple steps and extensive periods of time to deposit a coating; (4) the use of commercially unattractive steps, such as sealing and/or the use of elevated temperature solutions; and (5) the necessity to use specific pretreatments and solution compositions in order to coat multiply alloys, especially aluminum 2024 alloys.

The ability to deposit a cerium-based conversion coating composition on the surface of a high copper-containing aluminum alloy, such as aluminum 2024, which is thick enough to provide corrosion protection can be problematic. Known coating compositions often exhibit poor adhesion or require the use of multiple steps and/or elevated temperature solutions to deposit the coating composition on the alloy. Specific deoxidizers have been used to more uniformly coat the metal substrate. However, when industrially accepted cleaners and deoxidizers are used on the alloy, the surface of relatively high copper-containing aluminum alloys has a tendency to pit and corrode as the cerium-based coating composition is deposited on the alloy. The rate of the undesired pitting can be more extensive than the ability of the cerium to deposit onto the alloy, resulting in visual pits across the alloy surface.

Therefore, there is a need for a conversion coating that can replace chromate based conversion coatings and that overcomes several of the deficiencies, disadvantages and undesired parameters of known replacements for chromate based conversion coatings.

SUMMARY

According to the present invention, a conversion coating composition for coating a metal substrate comprising an aqueous carrier and first and second salts, each salt comprising an anion and a cation, the anion of the first and second salts being different, and the cation of the first and second salts being the same or different, wherein each cation, individually, is a rare earth element. The first and second salts in combination are present in the composition in an amount effective to form a corrosion resistant coating on the metal substrate. The conversion coating can additionally have an oxidizing agent such as hydrogen peroxide, and/or a self-cleaning additive, such as a surfactant and/or a detergent. Preferably, but not required, the coating compositions have an oxidizing agent and the first and second salts in combination are present in the composition in at least about 0.04 weight percent, and the first and second salts comprise at least two different anions of the same metal cation, such as a halide and a nitrate of a rare earth element cation and an oxidizing agent.

In another embodiment, the invention is a conversion coating composition for coating a metal substrate comprising a plating bath having the dissolution products from one or more rare earth element oxides and an acid generating compound. According to this embodiment, the acid generating compound can be one or more of gypsum, anhydrite, celestite, and barite, in hydrous and anhydrous forms, in naturally occurring mineral forms, and as precipitated salts. The plating bath composition can additionally have an oxidant and/or other additives.

In another embodiment, the invention is a metal substrate coating comprising a conversion coating prepared from a coating composition and a primer coat, such as a chromate based coating composition, or a chromate-free, rare earth element based coating composition. The metal substrate coating can additionally have a topcoat layer, such as an advanced performance topcoat, or the metal substrate can have a self-priming top-coat or an enhanced self-priming topcoat.

In another embodiment, the invention is a process for coating a metal substrate comprising providing a metal substrate and coating the metal substrate with a coating composition. The metal substrate can be pre-treated prior to placing the conversion coating composition on the metal substrate, such as by pre-cleaning the metal substrate prior to placing the conversion coating composition on the metal substrate, and/or by deoxidizing the metal substrate prior to placing the conversion coating composition on the metal substrate. Preferably, the coating composition also includes an oxidizing agent and the first and second salts, in combination, are present in the composition in at least about 0.04 weight percent. In another embodiment, the invention is a method of coating a metal substrate comprising providing a metal substrate having a surface and coating the metal substrate with a coating composition. Then, at least one rare earth element cation is oxidized to form a rare earth element oxide or a rare earth element hydroxide coating at or near the surface of the metal substrate.

DESCRIPTION

According to one embodiment of the present invention, there is provided a conversion coating composition for coating a metal surface, also referred to as a metal substrate. The composition comprises an aqueous carrier and first and second salts, each salt comprising an anion and a cation, the anion of the first and second salts being different, and the cation of the first and second salts being the same or different, wherein each cation, individually, is a rare earth element.

The conversion coating composition minimizes or overcomes problems of known conversion coating compositions, such as excessive over-coating, which can lead to poor adhesion, the need for sealing the coatings, undesired excessive corrosion of the substrate during coating deposition, and the need for multiple step processing. The conversion coating compositions also exhibit good adhesion to metal substrates, minimize the tendency to over-coat, can be used to treat multiple aluminum alloys of low to relatively high copper content without the use of multiple steps or specific deoxidizers, and can be used as part of a complete chromate-free coating system. Another advantage of the conversion coating composition is the ability of the coating composition to be used in conjunction with a paint system, such as with a primer and topcoat that provides corrosion resistance comparable to known chromate containing systems.

As used herein, the following terms have the following meanings.

The term "salt" means an ionically bonded inorganic compound and/or the ionized anion and cation of one or more inorganic compounds in solution.

The term "substrate" means a material having a surface. In reference to applying a conversion coating, the term "substrate" refers to a metal substrate such as aluminum, iron, copper, zinc, nickel, magnesium, and alloys thereof.

The term "conversion coating", also referred to as a "conversion treatment" or "pretreatment" means a treatment for a metal substrate that causes the metal surface to be converted to a different material. The meaning of the terms "conversion treatment" and "conversion coating" also include a treatment for a metal surface where a metal substrate is contacted with an aqueous solution having a metal that is a different element than the metal contained in the substrate. An aqueous solution having a metal element in contact with a metal substrate of a different element, where the substrate dissolves, leading to precipitation of a coating (optionally using an external driving force to deposit the coating on the metal substrate), is also within the meaning of the terms "conversion coating" and "conversion treatment".

The term "rare earth element" means an element in Group IIIB of the periodic table of the elements, that is, elements 57-71 and Yttrium.

As used in this disclosure, the term "comprise" and variations of the term, such as "comprising" and "comprises," are not intended to exclude other additives, components, integers ingredients or steps.

All amounts disclosed herein are given in weight percent of the total weight of the composition at 25° C. and one atmosphere pressure, unless otherwise indicated.

In one embodiment, the present invention is a composition for coating a metal substrate. The composition comprises an aqueous carrier and first and second salts, each salt comprising an anion and a cation, the anion of the first and second salts being different, and the cation of the first and second salts being the same or different, wherein each cation, individually, is a rare earth element, and the first and second salts in combination are present in the composition in an amount effective to form a corrosion resistant coating on the metal substrate.

According to the present invention, the first and second salts are rare earth element salts, such as praseodymium, cerium, neodymium, samarium, and terbium salts. It has been found that conversion coating compositions having rare earth elements salts, where the salts are mixtures of multiple anions of one or more rare earth element cations, incorporated into the same coating solution, are significantly influential on the deposition parameters of the resulting rare earth element coating, the resulting coating's morphology, and the resulting coating's performance. Further, these compositions are capable of affecting the deposition environment of the rare earth element metal cations as they precipitate onto the metal substrate, that is, the compositions are capable of reaction at or near the surface of the metal substrate (during local changes in pH at the surface of a metal or metal alloy, such as an aluminum 7075 or 2024 alloy), to form a coating on the substrate. The specific nature of the induced environment created by the coating composition and coating methods allow for formation of a more uniform coating. The formation of pits that can be formed during the coating process the tendency of the rare earth deposits to overcoat, which can result in poor adhesion are minimized with the coating compositions according to the present invention. In addition, the specific rare earth element metal cations used in the coating compositions may, under certain conditions, deposit onto a metal substrate without undergoing a change in oxidation state during deposition, allowing for regions of the metal substrate that may not normally be coated to have a rare earth element deposit form.

It is preferable, but not required that at least one rare earth element salt is a Cerium(III) salt, present in the conversion coating composition in an amount from about 0.04 to about 70 weight percent. More preferably, in combination, the rare earth element salts are present in the composition in at least about 1.5 weight percent, and most preferably, the rare earth element salts are present in the composition in about 8 weight percent. In one embodiment, the first rare earth element salt is Cerium halide present in the conversion coating composition, initially in a trivalent oxidation state, in an amount from about 0.01 to about 24 weight percent, and the second rare earth element salt is Cerium nitrate present in the conversion coating composition, initially in a trivalent oxidation state, in an amount from about 0.03 to about 60 weight percent. However, use of such salts other than cerium can be used according to the present invention and can improve the stability of the plating solutions at broader pH ranges in the presence of an oxidizer, as will be understood by those of skill in the art with reference to this disclosure.

According to the present invention, optionally, the conversion coating composition can additionally contain an oxidizing agent, such as peroxides, persulfates, perchlorates, sparged oxygen, bromates, peroxi-benzoates, and ozone. It is preferable, but not required that the oxidizing agent is hydrogen peroxide, present in the conversion coating composition in an amount from about 0.1 to about 15 weight percent of a 30 weight percent solution. However, the conversion coating composition of the present invention can comprise other oxidizing agents, as will be understood by those of skill in the art with reference to this disclosure.

The pH of the bulk conversion coating composition may vary depending upon the rare earth components used, as well as the nature of the desired properties of the final coating. An increase in pH near or on the metal surface facilitates precipitation of the rare earth species. An increase in local pH in the vicinity of the metal substrate may be generated in several ways, such as generation of local cathodes across surface, pre-seeding metal surface with a hydroxyl species, and the like. The bulk solution pH of a typical conversion coating composition has a pH range of between about 1.5 and about 8. A preferred pH range is between about 1.5 and about 5. In certain embodiments, however, the pH range is between about 1.5 and about 12. Examples of embodiments where the pH range is about 12 includes a conversion coating using or combining a pre-cleaning process, such as a basic pre-treatment cleaner, or the incorporation of the cleaning and conversion coating in a single step.

According to the present invention, optionally, the conversion coating composition can additionally contain an additive to provide desired aesthetic or functional effects. An additive, if used, can constitute from about 0.01 weight percent up to about 80 weight percent of the total weight of the conversion coating composition. These optional additives are chosen as a function of the conversion coating system and application. Suitable additives can include a solid or liquid component admixed with the conversion coating composition for the purpose of affecting one or more properties of the composition. Examples of additives include a surfactant, which can assist in wetting the metal substrate, and other additives that can assist in the development of a particular surface property, such as a rough or smooth surface. Other examples of suitable additives include flow control agents, thixotropic agents such as bentonite clay, gelatins, cellulose, anti-gassing agents, degreasing agents, anti-foaming agents, organic co-solvents, catalysts, dyes, amino acids, urea based compounds, complexing agents, valence stabilizers, and the like, as well as other customary auxiliaries. However, other suitable additives are known in the art of formulated surface coatings and can be used in the conversion coating compositions according to the present invention, as will be understood by those of skill in the art with reference to this disclosure.

Preferably, the conversion coating composition is an aqueous coating composition. In one embodiment, the conversion coating composition comprises an aqueous carrier, which optionally contains one or more organic solvents. Suitable solvents include propylene glycol, ethylene glycol, glycerol, low molecular weight alcohols, and the like.

In a preferred, but not required embodiment, the conversion coating composition additionally comprises a media, which is a surfactant, mixture of surfactants, or detergent-type aqueous solution, present in the conversion coating solution in an amount from about 0.02 weight percent.

In one embodiment, the conversion coating composition having a surfactant, mixture of surfactants, or detergent-type aqueous solution is utilized to combine a metal substrate cleaning step and a conversion coating step in one process. In another embodiment, the conversion coating composition having a surfactant, mixture of surfactants, or detergent-type aqueous solution can additionally contain an oxidizing agent, as previously described herein.

In another embodiment, a conversion coating is applied as a dissolution product obtained from a slurry of rare earth oxides in the presence of a mineral, an oxidizing agent, and an optional additive, to conversion coat a metal surface. According to this embodiment, a rare earth oxide, such as cerium (III) hydrated oxide, cerium (IV) oxide, praseodymium (III) oxide, praseodymium (IV) oxide, praseodymium (III,IV) oxide, samarium (III) oxide, neodymium (III) oxide, terbium (III) oxide, terbium (IV) oxide, terbium (III,IV) oxide, lanthanum (III) oxide, ytterbium (III) oxide, yttrium (III) oxide, and/or mixtures thereof, are combined with an acid generating compound, such as gypsum, anhydrite, celestite, barite, and the like, in either hydrous or anhydrous forms, and/or as their naturally occurring minerals, and/or as precipitated salts, an oxidizing agent, and an optional additive.

The rare earth element conversion coating compositions may be prepared in several ways, varying the order and nature of component addition. In general, the rare earth element conversion coating solutions are prepared by first dissolving the appropriate amount of rare earth halide in the appropriate amount of distilled/de-ionized water. The other rare earth salt or salts are then dissolved into the rare earth halide solution. The pH of the bulk solution may be lowered to about 1.5 using an appropriate acid, such as but not limited to nitric, sulfuric, hydrochloric, or increased to a pH of about 12 using an appropriate base, such as but not limited to sodium hydroxide, surfactants, detergents, soaps, and the like. Additives and/or solvents, if any, are then incorporated into the rare earth-containing solution in the appropriate manner. The appropriate amount of hydrogen peroxide is then added about five minutes to the solution prior to use.

According to another embodiment, the present invention is a process for coating a metal substrate. According to this embodiment, a metal substrate is provided. Then, the metal substrate is contacted with a conversion coating composition according to the present invention.

According to one embodiment, the metal substrate is pre-treated prior to contacting the metal substrate with the conversion coating. The term pre-treating refers to a surface modification of the substrate that enhances the substrate for subsequent processing. Such surface modification can include one or more operations, including, but not limited to cleaning (to remove impurities and/or dirt from the surface), deoxidizing, and/or application of one or more solutions or coatings, as is known in the art. Pretreatment has many benefits, such as generation of a more uniform starting metal surface, improved adhesion of a subsequent coating to the pretreated substrate, or modification of the starting surface in such a way as to facilitate the deposition of the subsequent conversion coating.

According to a preferred process, the metal substrate is prepared by first solvent rinsing the substrate to assist in removal of inks and oils that may be on the metal surface. The metal substrate is then degreased and/or deoxidized.

In one embodiment, the metal substrate is pre-treated by mechanically deoxidizing the metal prior to placing the conversion coating composition on the metal substrate. An example of a typical mechanical deoxidizer is uniform roughening of the surface using a Scotch-Brite pad.

In another embodiment, the metal substrate is pre-treated by cleaning with an alkaline cleaner prior to application of the conversion coating composition. A preferred pre-cleaner is a basic (alkaline) pretreatment cleaner, where the surface of the metal substrate is treated with a sodium hydroxide based cleaner, which can also have one or more corrosion inhibitors to "seed" the surface of the metal substrate during the cleaning process with the corrosion inhibitor to minimize metal surface attack, and/or facilitate subsequent conversion coating. Suitable pre-cleaners include degreasing in an alkaline cleaner, such as Turco 4215-NCLT, available from Telford Industries, Kewdale, Western Australia.

In another embodiment, the metal substrate is deoxidized to further remove contaminants on the metal's surface, as well as to remove the native oxide layer, thus allowing for a more uniform surface deposit a coating onto the metal surface. Suitable deoxidizers include industrially acceptable deoxiders, such as Amchem 7/17 deoxidizers, available from Henkel Technologies, Madison Heights, Mich. A preferred deoxidizing agent is a phosphoric acid-based deoxidizer, such as Deft Inc., product code number 88×2, available from Deft Inc., Irvine, Calif.

Additional optional steps for preparing the metal substrate include the use of a surface brightener, such as an acid pickle or light acid etch, a smut remover, as well as immersion in an alkaline solution per one of the embodiments of this disclosure. The metal substrate is typically rinsed with either tap water, or distilled/de-ionized water between processing steps, and is rinsed well with distilled/de-ionized water prior to contact with the conversion coating composition.

Once the metal substrate has been appropriately pretreated, cleaned and/or deoxidized, the conversion coating composition is then allowed to come in contact with at least a portion of the metal's surface. The metal substrate is contacted with the conversion coating composition using any conventional technique, such as dip immersion, spraying, or spread using a brush, roller, or the like, and so forth. With regard to application via spraying, conventional (automatic or manual) spray techniques and equipment used for air spraying and electrostatic spraying can be used. In other embodiments, the coating can be an electrolytic-coating system or the coating can be applied in paste or gel form. The conversion coating compositions may be applied in any suitable thickness, depending on the application requirements. In a preferred but not required embodiment, the final coating thickness is between about 100 to about 600 nm. During application, the conversion coating composition is maintained at a temperature between about 10 degrees C. and the boiling temperature of the composition, which varies depending upon the nature of the composition. A preferred temperature range is between about 25 degrees C. and about 45 degrees C., and more preferably, about 25 degrees C.

When the metal substrate is coated by immersion, the immersion times may vary from a few seconds to multiple hours based upon the nature and thickness of conversion coating desired. When the metal substrate is coated using a spray application, the conversion coating solution is brought into contact with at least a portion of the substrate using conventional spray application methods. The dwell time in which the conversion coating solution remains in contact with the metal substrate may vary based upon the nature and thickness of conversion coating desired. Typical dwell times range from a few seconds to multiple hours. When the metal substrate is treated using a gel application, the conversion coating gel is brought into contact with at least a portion of the metal substrate using either conventional spray application methods or manual swabbing. The dwell time in which the conversion coating gel remains in contact with the metal substrate may vary based upon the nature and thickness of conversion coating desired. Typical dwell times range from a few seconds to multiple hours. The conversion coating may also be applied using other techniques known in the art, such as application via swabbing, where an appropriate media, such as cloth, is used to soak up the conversion coating solution and bring it into contact with at least a portion of a metal substrate's surface. Again, the dwell time in which the conversion coating solution remains in contact with the metal substrate may vary based upon the nature and thickness of conversion coating desired. Typical dwell times range from a few seconds to multiple hours. If an externally driven electrolytic application process is desired, such as electroplating, care should be given to the concentration level of halides present in the conversion coating plating bath, such as to not generate harmful species, such as chlorine gas, or other harmful by-products.

According to another embodiment, the present invention is a metal substrate coating system containing a conversion coating composition and a primer coat. The conversion coating compositions according to the present invention are compatible with currently used chromate-based primers and advanced performance topcoats. The primer coat can be a conventional chromate based primer coat, such as the Deft Inc. primer coat, product code 44GN072, available from Deft Inc., Irvine, Calif. Alternately, the primer coat can be a chromate-free primer coat, such as the coating compositions described in U.S. patent application Ser. No. 10/758,973, titled "CORROSION RESISTANT COATINGS CONTAINING CARBON", and U.S. patent application Ser. Nos. 10/758,972, and 10/758,972, both titled "CORROSION RESISTANT COATINGS", all of which are incorporated herein by reference, and other chrome-free primers that are known in the art, and which can pass the military requirement of MIL-PRF-85582 Class N or MIL-PRF-23377 Class N may also be used with the current invention. Preferred primer coats are available from Deft Inc., Irvine, Calif., product code numbers Deft 02GN083 or Deft 02GN084.

The metal substrate coating system can additionally contain a topcoat. The term "topcoat" refers to a mixture of binder(s), which can be an organic or inorganic based polymer or a blend of polymers, typically at least one pigment, can optionally contain at least one solvent or mixture of solvents, and can optionally contain at least one curing agent. A topcoat is typically the coating layer in a single or multi-layer coating system whose outer surface is exposed to the atmosphere or environment, and its inner surface is in contact with another coating layer or polymeric substrate. Examples of suitable topcoats include those conforming to MIL-PRF-85285D, such as Deft Inc. product code numbers Deft 03W127A and Deft 03GY292, available from Deft Inc., Irvine, Calif. A preferred topcoats is an advanced performance topcoat, such as Deft Inc. product code numbers Defthane® ELT™ 99GY001 and 99W009, available from Deft Inc., Irvine, Calif. However, other topcoats and advanced performance topcoats can be used in the coating system according to the present invention as will be understood by those of skill in the art with reference to this disclosure.

In an alternate embodiment, the present invention is a metal substrate coating system containing a conversion coating according to the present invention and a self-priming topcoat, or an enhanced self-priming topcoat. The term "self-priming topcoat", also referred to as a "direct to substrate" or "direct to metal" coating, refers to a mixture of a binder(s), which can be an organic or inorganic based polymer or blend of polymers, typically at least one pigment, can optionally contain at least one solvent or mixture of solvents, and can optionally contain at least one curing agent. The term "enhanced self-priming topcoat", also referred to as an "enhanced direct to substrate coating" refers to a mixture of functionalized fluorinated binders, such as a fluoroethylene-alkyl vinyl ether in whole or in part with other binder(s), which can be an organic or inorganic based polymer or blend of polymers, typically at least one pigment, can optionally contain at least one solvent or mixture of solvents, and can optionally contain at least one curing agent. Examples of self-priming topcoats include those that conform to TT-P-2756A. Preferred self-priming topcoats are Deft product code numbers 03W169 and 03GY369, available from Deft Inc., Irvine, Calif. Examples of enhanced self-priming topcoats include Defthane® ELT™/ESPT, available from Deft Inc., Irvine, Calif. An example of a preferred self-priming topcoat is Deft Inc. product code number 97GY121, available from Deft Inc., Irvine, Calif. However, other self-priming topcoats and enhanced self-priming topcoats can be used in the coating system according to the present invention as will be understood by those of skill in the art with reference to this disclosure.

The self-priming topcoat and enhanced self-priming topcoat is typically applied directly to the conversion coated substrate. The self-priming topcoat and enhanced self-priming topcoat can optionally be applied to an organic or inorganic polymeric coating, such as a primer or paint film. The self-priming topcoat layer and enhanced self-priming topcoat is typically the coating layer in a single or multi-layer coating system where the outer surface of the coating is exposed to the atmosphere or environment, and the inner surface of the coating is typically in contact with the conversion coated substrate or optional polymer coating or primer.

The topcoat, self-priming topcoat, and enhanced self-priming topcoat can be applied to the conversion coated substrate, in either a wet or "not fully cured" condition that dries or cures over time, that is, solvent evaporates and/or there is a chemical reaction. The coatings can dry or cure either naturally or by accelerated means for example, an ultraviolet light cured system to form a film or "cured" paint. The coatings can also be applied in a semi or fully cured state, such as an adhesive.

In another embodiment, the present invention is a method of coating a metal substrate. According to this embodiment, the method comprises providing a metal substrate having a surface. Then, at least a portion of the metal substrate is contacted with a coating composition. In a preferred embodiment, the method comprises coating the metal substrate with a coating composition that additionally comprises an oxidizing agent, where the first and second salts in combination are present in the composition in at least about 0.04 weight percent. Preferably, a conversion coating composition is placed in contact with at least a portion of the metal substrate, the coating composition having two different anions of the same or different rare earth element cation and an oxidizing agent. Next, at least one rare earth element cation is oxidized at or in the vicinity of the metal surface, and precipitate as either a hydroxide, oxide, complexed salt, or combinations thereof coating onto the metal surface. Other rare earth element cations present in the composition also can be oxidized on the metal surface, or may require a greater oxidation potential and/or precipitation pH. This potentially minimizes the extent of over coating, minimizes the formation of undesired sludge, may allow for a more protective coating to form over various regions, and may not require a change in valence to precipitate onto the metal surface. The use of multiple anions also facilitates this process by modifying the environment close to the metal surface where these reactions take place.

The invention will be further described by reference to the following non-limiting examples, which are offered to further illustrate various embodiments of the present invention. It should be understood, however, that many variations and modifications be made while remaining within the scope of the present invention.

EXAMPLE 1

Preparation of Rare Earth Element Conversion Coatings

The following example demonstrates the general procedures for preparation of the rare earth element conversion coating compositions, metal substrate preparation, and application of the coating compositions to the metal substrate. However, other formulations and modifications to the following procedures can be used according to the present invention as will be understood by those of skill in the art with reference to this disclosure.

Coating Composition Preparation:

The rare earth element conversion coating composition was prepared with the amounts of ingredients shown in Table 1 for panel 1A. The coating composition was prepared by first dissolving 90 g of cerium chloride in 860 g of distilled/de-ionized water. $Ce(NO_3)_3$ (40 g), was then dissolved into the cerium chloride solution. Hydrogen peroxide (10 g, 30% solution) was then added to the solution about five minutes prior application to the metal substrate.

Metal Substrate (Panel) Preparation:

The metal substrate, panel 1A, was prepared as follows. Panel 1A, a bare 2024-T3 aluminum alloy panel, was first solvent rinsed and then deoxidized for about three to five minutes using Deft product code 88×2 formulation (Deft, Inc., Irvine, Calif.). The panel was then rinsed well with de-ionized water prior to contact with the conversion coating solution.

Application Procedure:

The conversion coating solution, prepared as described above, was applied to the metal substrate using a dip/immersion process. After application of the conversion coating, the coated substrate was rinsed well with de-ionized water.

TABLE 1

Solution Compositions Used to Prepare Coated Panels:

| Component | Panel 1 | Panel 2A | Panel 2B | Panel 2C | Panel 3A | Panel 3B | Panel 4B | Panel 7A/7B | Panel 8A/8B | Panel 9A/9B | Panel 10B/11A |
|---|---|---|---|---|---|---|---|---|---|---|---|
| $Nd(NO_3)_3$ | — | — | — | 5 g | — | — | — | — | — | — | — |
| $Ce(NO_3)_3$ | 40 g | 13 g | — | — | — | 5 g | 8 g | 5 g | 5 g | 19 g | 96 g |
| $CeCl_3$ | 90 g | — | 13 g | 8 g | 13 g | 8 g | 16 g | 67 g | 10 g | — | 44 g |
| $H_2O_2$ (30%) | 10 g | 14 g | 14 g | 14 g | 14 g | 14 g | 15 g | 100 g | 15 g | 27 g | 16 g |
| De-Ionized Water | 860 g | 973 g | 973 g | 973 g | 973 g | 973 g | 961 g | 828 g | 970 g | 954 g | 844 g |
| Total | 1000 g | 1000 g | 1000 g | 1000 g | 1000 g | 1000 g | 1000 g | 1000 g | 1000 g | 1000 g | 1000 g |

EXAMPLE 2

Comparison of Rare Earth Element Based Coating Compositions Applied Via Immersion Three bare 2024-T3 aluminum alloy panels, panels 2A, 2B, and 2C, were prepared using the coating composition preparation procedure described in Example 1 with the formulations shown in Table 1.

The coating compositions were applied by immersion at a deposition time of about five minutes each.

As shown in Table 1, panel 2A was coated with a $Ce(NO_3)_3$ based coating composition, panel 2B was coated with a $CeCl_3$ based coating composition, and panel 2C was coated with a $CeCl_3/Nd(NO_3)_3$ based coating composition.

Visual observation of panel 2A showed that little or no coating was formed on the panel using the rare earth nitrate based coating composition. Visual observation of panel 2B showed excessive corrosion and surface pitting with the coating that was formed using the rare earth chloride based coating composition. However, visual observation of Panel 2C showed that a dense coating with no excessive pitting was formed using the $CeCl_3/Nd(NO_3)_3$ based coating composition, i.e., a coating composition having a combination of two different anions of different rare earth cations.

EXAMPLE 3

Comparison of Panels Treated with One or Two Anions of a Rare Earth Element Metal Cation Via Spray Application Panels 3A and 3B, bare 2024-T3 aluminum alloy panels, were prepared using the coating composition preparation procedure described in Example 1 with the formulations shown in Table 1. As shown in Table 1, panel 3A was coated with a $CeCl_3$ based coating composition and panel 3B was coated with a $CeCl_3/Ce(NO_3)_3$ based coating composition. The coating compositions were spray applied.

Visual observation of panel 3A showed that when the panel was coated with a composition containing one anion of a rare earth element metal cation, the metal surface was extensively pitted. However, visual observation of panel 3B showed that when the panel was coated with a composition containing two anions of a rare earth element metal cation, not only did the coating not extensively pit the substrate, but the coating did not excessively over coat the substrate and exhibited good adhesion.

EXAMPLE 4

Comparison of Untreated and Treated Aluminum Alloy Panels

Panel 4A, an untreated bare 2024-T3 aluminum alloy panel, was prepared by solvent rinsing the panel using methyl ethyl ketone and then deoxidizing the panel for three minutes using Deft 88×2 solution (Deft Inc., Irvine, Calif.). Panel 4A was then rinsed well using de-ionized water and was not further treated with a coating composition. Panel 4A was exposed for 24 hours to an ASTM B-117 neutral salt spray test.

Panel 4B, a bare 2024-T3 aluminum alloy panel, was prepared using the coating composition preparation procedure described in Example 1 with the coating composition formulation shown in Table 1. As shown in Table 1, panel 4B was treated with a $CeCl_3/Ce(NO_3)_3$ based coating composition. Panel 4B was then exposed for 72 hours to an ASTM B-117 neutral salt spray test.

Visual observation of panel 4A, the untreated aluminum 2024-T3 panel, showed that the panel was severely corroded after 24 hours of the salt spray test, as compared to panel 4B. Visual observation of panel 4B, which was treated with a $CeCl_3/Ce(NO_3)_3$ based coating composition, showed marked corrosion resistance after 72 hours of the salt spray test.

EXAMPLE 5

Comparison of Alloy Panels after Solution Immersion

Panels 5A and 5B, bare 2024-T3 aluminum alloy panels, were prepared by first solvent rinsing the panels using methyl ethyl ketone and then deoxidizing the panels for three minutes using Deft 88×2 solution (Deft Inc., Irvine, Calif.). The panels were then rinsed well using de-ionized water.

Panel 5A was then immersed in a 2.5 weight percent sodium chloride solution for 8 hours.

Panel 5B was immersed in a solution containing 2.5 weight percent sodium chloride, and the dissolution products from a slurry containing 4.5 weight percent praseodymium (III) oxide and 4.5 weight percent gypsum for 8 hours.

Visual observation of Panel 5A, the aluminum 2024-T3 panel immersed in the sodium chloride solution for eight hours, showed excessive pitting and the formation of aluminum corrosion products on the metal surface. However, visual observation of panel 5B, the aluminum 2024-T3 specimen immersed in the sodium chloride solution in conjunction with the dissolution products of a rare earth oxide, an acid generating mineral, and sodium chloride, showed that the metal surface was free from extensive pitting after 8 hours of immersion. Thus, panels 5A and 5B demonstrated that the dissolution product from rare earth oxides in the presence of an acid generating compound were able to protect a relatively high copper-containing aluminum 2024-T3 alloy from corrosion in a solution of sodium chloride.

EXAMPLE 6

Comparison of Alloy Panels after Immersion in a Rare Earth Element Oxide Solution Having Additives Panels 6A and 6B, aluminum 2024-T3 alloy specimens, were prepared as follows. Panel 6A was prepared by immersing the panel in a solution containing the dissolution products of a slurry containing 4.5 weight percent praseodymium (III) oxide, 4.5 weight percent gypsum, and 9.5 weight percent hydrogen peroxide (30 weight percent solution) for 20 minutes. Panel 6B was prepared by immersing the panel in a solution containing the dissolution products of a slurry containing 4.5 weight percent praseodymium (III) oxide, 4.5 weight percent gypsum, and 9.5 weight percent hydrogen peroxide (30 weight percent solution), and 10 weight percent Joy™; liquid washing solution, for 20 minutes.

Visual observation of panel 6A showed that rare earth element containing conversion coatings were obtained over an aluminum 2024-T3 panel after being immersed in the solution containing the dissolution products from rare earth oxides in the presence of an acid generating mineral and an oxidant, with no additives present in the bath. Visual observation of panel 6B showed that rare earth element containing conversion coatings were obtained over an aluminum 2024-

T3 panel after being immersed in a solution containing the dissolution products from rare earth oxides in the presence of an acid generating mineral, an oxidant, and additives present in the plating bath. Thus, panels 6A and 6B demonstrate the ability of the dissolution products from rare earth oxides in the presence of an acid generating mineral, along with an oxidant and optional additive, to be able to conversion coat a high copper-containing aluminum 2024-T3 alloy specimen.

EXAMPLE 7

Pre-Cleaned Panels Treated with Rare Earth Element Based Coating Compositions

Panels 7A and 7B, clad and unclad copper-containing 2024-T3 alloy panels, were pre-cleaned and treated with a rare earth element based conversion coating as follows.

Both panels, panel 7A (an aluminum 2024-T3 alloy 1230 clad surface, a relatively low copper containing surface (less than 0.1 wt % copper)) and panel 7B (a bare 2024-T3 not clad surface, which is relatively high in copper (about 4.0 wt %)) were treated with a basic pretreatment cleaner having the formulation shown in Table 2.

TABLE 2

Basic Pretreatment Cleaner:

| Component (Premix I): | Amount |
| --- | --- |
| Sodium Hydroxide | 0.4 g |
| De-Ionized Water | 993.0 g |
| Total | 993.4 g |
| Component (Premix II): | |
| $PrCl_3$ | 0.2 g |
| $CeCl_3$ | 0.4 g |
| Distilled/De-Ionized Water | 6.0 g |
| Total | 6.6 g |
| (Premix I and Premix II) Total: | 1000 g |

The cleaner was prepared by mixing Premix I and II together prior to use. Panels 7A and 7B were pre-treated with the alkaline cleaner prior to the application of the conversion coating composition. The panels were not rinsed after being cleaned. Panels 7A and 7B were then treated with the rare earth element based conversion coating spray prepared according to the general procedure described in Example 1, using the formulations shown in Table 1.

Visual observation of panels 7A and 7B showed that pre-cleaning the panels prior to treatment with the rare earth element conversion coating improved the deposition rate of the coating composition. Visual observation of panels 7A and 7B also showed uniform application of the conversion coating to both the relatively low and high copper-containing alloy panel surfaces, panels 7A and 7B respectively, that were immersed in the basic pretreatment cleaner prior to application of the conversion coating.

EXAMPLE 8

Rare Earth Element Based Coating Compositions Applied Over Deoxidized Panels

Panels 8A and 8B were deoxidized and treated with a rare earth element based coating composition as follows.

Panel 8A, a bare aluminum 2024-T3 alloy panel, was chemically deoxidized by immersion in Deft 88×2 solution (Deft Inc., Irvine, Calif.) for about three to five minutes. Panel 8B, a bare aluminum 2024-T3 alloy panel, was mechanically deoxidized by wet scuffing the metal surface using a 7447 Scotch Brite™ pad. Both panels were then rinsed with deionized water and immersed in the rare earth element based conversion coating, prepared according to the procedure described in Example 1, using the formulation shown in Table 1, for about five minutes.

Visual observation of panel 8A showed that the conversion coating coated the chemically deoxidized metal surface. Visual observation of panel 8B showed that the conversion coating composition coated the mechanically deoxidized metal surface. Thus, panels 8A and 8B demonstrate the compatibility of the conversion coating compositions with various commercially accepted deoxidizing methods.

EXAMPLE 9

Comparison of Halide-Free Rare Earth Element Based Coating Compositions Applied Over Deoxidized Panels and Pre-Cleaned Panels Panels 9A and 9B, a deoxidized bare 2024-T3 aluminum alloy panel and a pre-cleaned bare 2024-T3 aluminum alloy panel, respectively, were treated with a halide-free rare earth element based coating composition as follows.

Panel 9A, a bare aluminum 2024-T3 alloy panel, was deoxidized by immersion in Deft 88X2 solution (Deft Inc., Irvine, Calif.) for about three to five minutes. Panel 9B, a bare aluminum 2024-T3 alloy panel, was pre-cleaned by a basic pretreatment cleaner, with the formulation shown in Table 2, for about five minutes. Both panels were then immersed in the rare earth element based conversion coating, prepared according to Example 1, using the formula shown in Table 1 for about 120 minutes.

Visual observation of panel 9A showed that the halide-free conversion coating composition coated the chemically deoxidized metal surface. Visual observation of panel 9B showed that the halide-free conversion coating composition coated the metal surface that was pre-cleaned using the basic pretreatment cleaner. Thus, panels 8A and 8B demonstrate that the halide-free conversion coating compositions are compatible with various commercially accepted deoxidizing and pre-treatment methods.

EXAMPLE 10

Comparison of Panels Treated with Chromate-Based and Rare Earth Element Based Coating Compositions Panels 10A and 10B, both bare aluminum 2024-T3 alloy panels, were treated with a chromate-based conversion coating, and a rare earth element based, chromate-free, conversion coating as follows.

Panel 10A was treated with a standard chromate-based conversion coating prepared per MIL-C-5541 using an Alodine 1200 type chromating process. Panel 10B was treated with the rare earth element based, chromate-free, conversion coating prepared according to the procedure described in Example 1, using the formulation shown in Table 1. The panel was coated with the conversion coating by swabbing.

Both panels 10A and 10B were then treated with the chromate-based primer MIL-P-85582, Deft product code 44GN072 (Deft Inc., Irvine, Calif.). The chromate-based primer had a dry film thickness of about one mil, and was allowed to cure for four hours before application of the topcoat. Defthane® ELT™ 99GY001 (Deft Inc., Irvine, Calif.) was used as the topcoat and had a dry film thickness of about two mils. The topcoated panels were allowed to cure for two weeks prior to testing. After curing, both panels were then exposed to 3000 hours of an ASTM B-117 neutral salt spray test.

Visual observation of panels 10A and 10B showed that the corrosion resistance provided by the chromate-based conversion coating/chromate-based primer/advanced performance topcoat system used to coat panel 10A was comparable to that of the chromate-free conversion coating/chromate-based primer/advanced performance topcoat system used to coat panel 10B. Thus, panels 10A and 10B demonstrate that the rare earth element conversion coating compositions are compatible with various commercially accepted chromated primer systems.

EXAMPLE 11

Aluminum Alloy Panel Treated with a Complete Chromate-Free Coating System

Panel 11A was prepared by treating a bare aluminum 2024-T3 alloy panel with a complete rare earth element based, chromate-free, coating system as follows. Panel 11A was coated with a chromate-free conversion coating prepared according to the procedure described in Example 1, using the formulation shown in Table 1. The panel was coated by swabbing.

Panel 11A was then treated with the chromate-free primer, Deft product code number 02GN083 (Deft Inc., Irvine, Calif.). The primer coating had a one mill dry film thickness and allowed to cure for one week. After curing, the panel was scribed and exposed to 1000 hours of an ASTM B-117 neutral salt spray test. After testing, the primer coating was removed from the bottom half of the panel to allow for visual inspection of the underlying metal substrate.

Visual observation of panel 11A showed that the exposed, scribed region of the metal substrate was protected, allowing for only minor corrosion to occur in the scribe. This suggests a throwing power, or passivation ability of the chrome-free coating system to protect the exposed metal. In the bottom half of panel 11A, where the primer coating was removed, the underlying coated metal substrate was protected from corrosion by the chrome free coating system.

Although the present invention has been discussed in considerable detail with reference to certain preferred embodiments, other embodiments are possible. Therefore, the scope of the appended claims should not be limited to the description of preferred embodiments contained herein.

What is claimed is:

1. A composition for coating a metal substrate comprising:
   an aqueous carrier;
   an oxidizing agent; and
   first and second salts, the first salt comprising a rare earth element nitrate, and the second salt comprising a rare earth element halide, and the first and second salts in combination are present in the composition in an amount effective to form a corrosion resistant coating on the metal substrate.

2. A composition according to claim 1 wherein at least one salt is capable of reaction at or near the surface of a metal substrate to form a coating on the metal substrate.

3. A composition according to claim 1 wherein the first and second salts in combination are present in the composition in at least about 0.04 weight percent.

4. A composition according to claim 3 wherein the first and second salts in combination are present in the composition in at least about 1.5 weight percent.

5. A composition according to claim 4 wherein the first and second salts in combination are present in the composition in 8 weight percent.

6. A composition according to claim 1 wherein at least one 1 wherein at least one of the fist salt or the second salt comprises a Cerium (III) cation.

7. A composition according to claim 6 wherein the first salt and the second salt both comprise Cerium (III) cations.

8. A composition according to claim 6 wherein the first salt is Cerium (III) nitrate and the second salte is a Cerium (III) halide.

9. A composition according to claim 1 wherein the first salt is cerium nitrate or neodymium nitrate.

10. A composition according to claim 1 wherein the second salt is cerium chloride.

11. A composition according to claim 1 wherein each cation of the first and second salts is a different rare earth element cation.

12. A composition according to claim 1 wherein the oxidizing agent is hydrogen peroxide.

13. A composition according to claim 1 further comprising a self cleaning additive.

14. A composition according to claim 13 wherein the self cleaning additive is a surfactant or a detergent.

15. A composition according to claim 1 wherein the first and second salts in combination are present in the composition in at least about 0.04 weight percent effective to form a corrosion resistant coating on the metal Substrate, and wherein each salt comprises the same rare earth element cation.

16. A composition according to claim 1 wherein the oxidizing agent is a hydrogen peroxide solution.

17. A composition according to claim 1 wherein:
   the first salt is cerium nitrate or neodymium nitrate;
   the second salt is cerium chloride; and
   the oxidizing agent is a hydrogen peroxide solution. combination are present in the composition in about 8 weight percent.

18. A composition for coating a metal substrate comprising:
   an aqueous carrier;
   first and second salts, wherein
   the first salt is cerium nitrate, present in the composition in an amount from about 0.01 weight percent to about 24 weight percent;
   the second salt is cerium chloride, present in the composition in an amount from about 0.03 weight percent to about 60 weight percent; and
   an oxidizing agent comprising a 30 weight percent hydrogen peroxide solution, present in the composition in an amount of from about 0.1 weight percent to about 15 weight percent.

19. A composition for coating a metal substrate, the composition consisting essentially of:
   an aqueous carrier;
   first and second rare earth element salts, wherein
   the first rare earth element salt is cerium nitrate or neodymium nitrate;
   the second salt is cerium chloride, wherein the first and second salts in combination are present in the composition in an amount effective to form a corrosion resistant coating on the metal substrate; and
   an oxidizing agent.

* * * * *